Sept. 20, 1966     J. A. SCUDDER     3,274,322
METHOD OF FLOW FORMING POLYURETHANE AND LIKE MATERIAL
Filed March 9, 1964
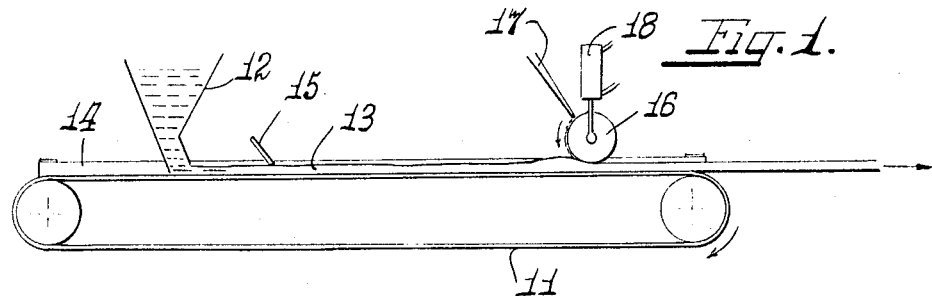
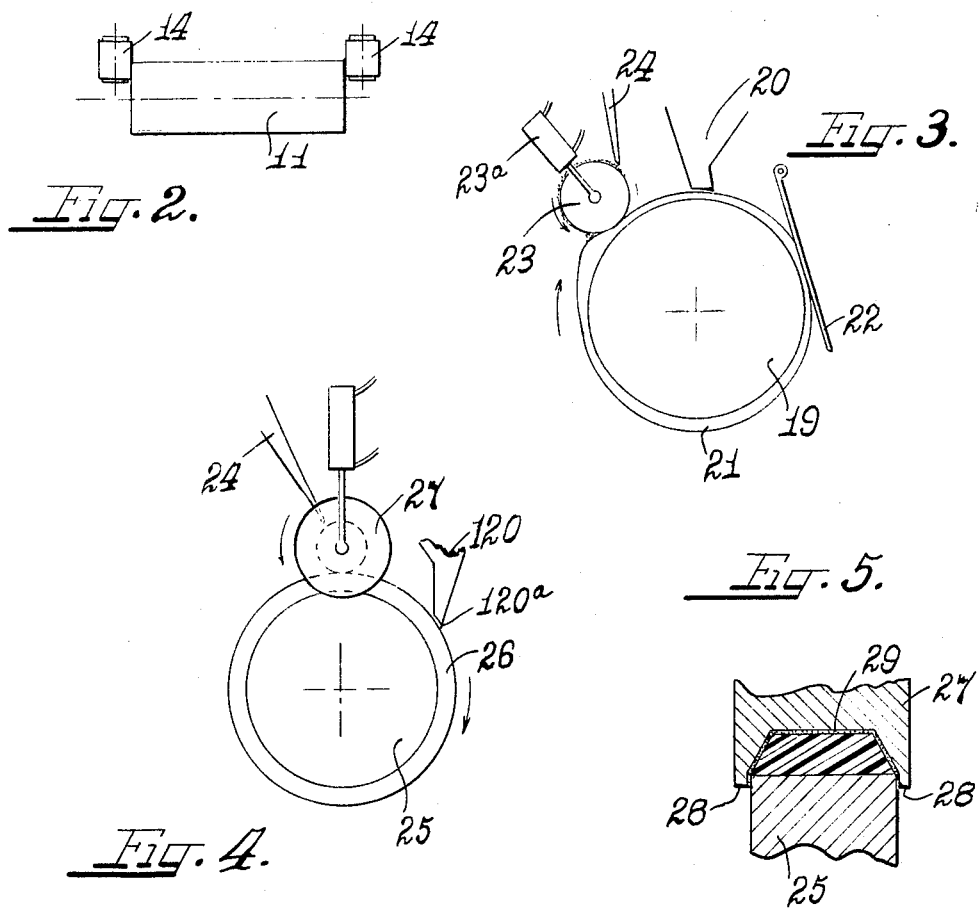
INVENTOR.
John A. Scudder
BY
Elmer L. Quickel
Attorney.

3,274,322
METHOD OF FLOW FORMING POLYURETHANE AND LIKE MATERIAL
John A. Scudder, Chicago, Ill., assignor to Chemechanical, Inc., South Holland, Ill., a corporation of Illinois
Filed Mar. 9, 1964, Ser. No. 350,194
8 Claims. (Cl. 264—213)

This application is a continuation-in-part of my copending application Serial No. 279,831, filed May 13, 1963.

The invention relates to improvements in the method of forming articles from polyurethane and like material and more particularly to a novel liquid flow method of forming such articles.

Many articles, such as belts, wheels and rolls, to name a few, are coated with or, in the instance of belts, are formed entirely of polyurethane, which most commonly is cast either at room temperatures or at slightly elevated temperatures. Casting polyurethane is extremely difficult and time consuming and uncertain of results. In the instance of wheels and rolls the only known practical method heretofore available was to cast onto a cylindrical body or core an external layer of polyurethane that was considerably thicker than the required finished diameter and to then grind the newly cast surface or tread until it was of the required diameter and concentric with the axis of the wheel or roll.

The present method teaches the steps of flowing a layer of polyurethane, while in a highly fluid state, onto a moving surface, which may be a belt, a wheel or a roll core, and subsequently, during movement of the surface and after the polyurethane has reached a semi-plastic but still flowable condition, subjecting the applied layer to the levelling effect of a second moving surface. Because of the semi-plastic "sticky" condition of the partially cured polyurethane at the time it is engaged by said second moving surface, the polyurethane would tend to adhere to the second surface and thus be withdrawn from the mass being worked. To avoid this, applicant applies liberally, a lubricating barrier in the form of a layer of oily substance, or a thick film, over the layer of polyurethane prior to its being engaged by the second moving surface and in sufficient quantity to completely envelope the exposed surface of the polyurethane. After leaving said second moving surface, the polyurethane is sufficiently cured so as to attain a physically stable condition whereupon, in the instance of forming a belt, it may be removed from the moving support surface. In instances of wheel or roll treading or belt surfacing, the wheel, roll core or belt may be initially coated with a bonding agent to insure a permanent bond between the wheel, roll core or belt and the applied layer of polyurethane. Ordinarily, the two moving surfaces travel at surface speeds that are substantially equal but in some instances, the speed of the second moving surface is varied.

It is therefore an object of this invention to provide a novel method of polyurethane application.

Another object is to provide a novel method for applying a coating of polyurethane and like material to a cylinder and in any desired thickness.

Another object is to provide a novel method of applying a uniform layer of polyurethane and like material onto a moving surface.

The method by which the above noted and other advantages and objects of the invention are attained will be described in the following specification, taken in conjunction with the illustrations of exemplary modes of application shown in the accompanying drawings, in which:

FIG. 1 is a representation of an exemplary form of apparatus that might be used for coating or forming a belt.

FIG. 2 is an end elevational view of the apparatus illustrated in FIG. 1.

FIG. 3 is an end view of a roll core showing the application of a polyurethane coating thereon.

FIG. 4 is a view illustrating the generation of a tread on a wheel.

FIG. 5 is a fragmentary sectional view on an enlarged scale of the apparatus illustrated in FIG. 4.

Generally speaking, in practicing the method herein disclosed, polyurethane or like material is flowed, while in a fluid state onto a moving surface such as a belt, a roll core or a wheel. In the instance of a roll, the material is flowed onto the roll core to the required thickness and at a rate consistant with the speed of rotation of the roll core so as to insure that the fluid material deposited thereon does not flow therefrom. This results in the initial accumulation of a greater amount at the lower circumferential surface of the roll core, which accumulation is subsequently levelled off to provide a concentric assembly.

In the instance of belt coating or forming, the fluid polyurethane or like material is flowed onto the belt and preliminarily formed by one or more doctor blades to the required thickness, and to a general shape, over the surface of the belt while the latter is moving at a controlled speed. In the event that the material is very fluid suitable dams may be provided at the edges of the belt to hold the material until it is firm enough to retain its shape.

Following the deposit of polyurethane to the requisite thickness, and after it has set into a semiplastic but still fluid state, a layer or heavy film of an oily substance is flowed over its entire surface so as to completely encapsulate the polyurethane layer. This oily substance may be of any consistency capable of forming a film that is maintained over the polyurethane during a subsequent dynamic working or pressurization step. Such pressurization is effected by means of a moving surface, preferably a roller, that overlies and contacts the oil coated polyurethane with sufficient pressure to cause dynamic flow of the polyurethane to level out the applied polyurethane and squeeze out any air pockets or bubbles that may be present in the layer. The effective surface of this roller advances in the same direction and preferably at substantially the same speed as or at a speed of 10% to 25% greater than the speed of the polyurethane layer, whereby the film laying between the roller and polyurethane surface develops a shear action and transmits same to the surface of the polyurethane being acted upon by the roller surfaces. The speed of the pressure roller may be varied during machine operation so as to increase or decrease the shearing action by dynamic flow. The applied pressure is very slight, measured in ounces per square inch, so as not to disturb the partially cured layer beyond that required to insure levelling and smoothing, and dynamic working of the layer to make it uniform and eliminate gas bubbles or pockets. After levelling or smoothing, the polyurethane is allowed to cure and if desired such curing may be speeded up by the application of heat for a substantialy period of time.

In the instance of the application of a coating on a belt or a tread on a roll core or wheel, a bonding agent is applied to the belt, roll core or wheel to insure a permanent bonding between it and the applied polyurethane. When a belt consisting entirely of polyurethane is to be produced, or a polyurethane annulus such as a packing ring is to be made on a mandrel, a release agent is applied to the surface on which it is formed and the belt or annulus is subsequently stripped from said surface.

In any case, the best and most consistent results are obtained if the doctor blade imparts a preliminary shape to the polyurethane layer which assures that, in the final shaping by rollers or other confining means, there will be substantial dynamic working of the polyurethane layer transversely of the direction of surface movement of the layer, so as to work out gas pockets or bubbles and fill any low spots in the surface. Thus, for example, a surface which is ultimately to be planar is preferably preliminarily shaped by the doctor blade to a very slight convex form, or to a very shallow inverted V.

Likewise, satisfactory results require that the tangent angle between the supporting surface (either belt or roll core) and the surface of the confining roller at the nip of the confining roller be rather small. Best results are obtained by passing the polyurethane layer through a nip at which the tangent angle is from about 5° to about 17°. Above about 22° the results are generally unsatisfactory.

The foregoing may better be understood upon reference to the representative illustrations of exemplary means or apparatus that may be employed and shown in the accompanying drawings:

In the FIGURE 1 and 2 disclosures, there is illustrated and endless belt 11, preferably made of Teflon or stainless steel, of considerable length which is positively driven at a given speed. Arranged above the trailing end of the upper reach of said belt is a suitable hopper 12 which has a throat sized to deliver onto the belt surface, and over its entire width, a steady stream of polyurethane 13 at a desired thickness and which may be of any desired consistency: from very fluid to semi-fluid. In order to prevent very fluid material from flowing over the sides of the belt 11, suitable dams in the form of generally upright confining belts 14, driven at the same speed as belt 11, may be provided one at each edge. As the belt 11 advances with its applied layer 13 of polyurethane, which obviously is in an uneven state, it may be carried beneath a doctor blade 15. During this period the polyurethane partially cures to become semi-plastic or substantially shape retaining whereupon it is carried beneath one or more rollers such as the driven roller 16. Prior to passing beneath the roller, a heavy layer of oily substance (which may be No. 30 motor oil) is deposited over the entire surface of the polyurethane layer as by means of an oil flow nozzle 17. Preferably the oily substance is applied to the down side of roller 16. This oily layer or envelope is essential to prevent the semi-cured polyurethane from sticking to the roller 16. Obviously any fluid substance having the ability of preventing the polyurethane from sticking to the roller may be used.

The roller 16, which applies minimal pressure to the polyurethane, functions to level or smooth out the polyurethane layer 13 so that the resultant belt or coating is of uniform thickness throughout its length and width. Preferably the roller 16 is carried in a frame which is adjustable with respect to the belt 11, preferably by means of a hydraulic piston-cylinder assembly 18, so as to establish the requisite contact with the layer during the dynamic working and leveling process and control the thickness of the finished layer. The roller is rotated at a rate to have the same surface speed or slightly greater than the rate of advance of the layer 13 beneath it, but when it is desired to burnish the surface of the polyurethane layer, the roller 16 is rotated at a lower rate of speed. After the smoothed layer leaves the roller, heat may be applied, as by means of infra red lamps (not shown) to hasten its curing.

When the polyurethane layer is to constitute a coating for the belt, the belt is initially coated with a bonding agent, whereas when the belt and polyurethane layer are to be separated after curing of the latter, the belt preferably is coated with a release agent. In either case the edge confining belts 14 are coated with a release agent.

Both of these agents are commercially available and are well known and are therefore not described.

For illustrative purposes only a single roller 16 is shown. Because of the fact that the surface of the polyurethane coating makes only a single pass under the roller 16, in practice a battery of such rollers must be provided to achieve proper working and shaping of the coating, with the rollers further from the doctor blade very slightly closer to the belt than is the roller which first contacts the coating. Rather than rollers 16, a moving forming belt may be used to contact the polyurethane layer over an extended length, and at a very slight angle to the supporting belt surface.

The belt type of operation may also be used to produce continuous strip packings of various surface shapes by utilizing a doctor blade that imparts a suitable preliminary shape to the coating, and by utilizing rollers that form the coating to a desired final shape. Under surface shape may also be controlled by using a supporting belt 11 of any desired configuration.

In the instance of roll or wheel treading, or production of annular objects, a structure illustrated by way of example in FIG. 3 may be used. Here the polyurethane is deposited in fluid form on a roll core or wheel 19, while said roll core or wheel is rotating in a vertical plane about its horizontal axis, from a hopper 20. The polyurethane may be of any flow consistency and the wheel or roll core is driven so that its surface speed is substantially equal to the rate of gravity flow of the material, thus preventing the material from dripping off the roll. The rate of rotation must be slow enough to avoid centrifugal force which could fling the material off the roll core or wheel. The applied layer may however, acquire a greater thickness at the lower region thereof, as at 21, consequently a doctor blade 22 is provided to function as a retarder and shaping blade. When subsequently subjected to the pressure of a driven roller 23 the layer, which is now partially cured, is levelled off so as to provide a truly concentric layer or tread. Here again it is necessary to apply a heavy layer or envelope of oily substance over the polyurethane layer before it reaches and is acted upon by roller 23. This may be accomplished by providing a supply nozzle 24 in a position to deliver the substance onto the roller 23. As before, the roller 23 is driven so as to have a surface speed not less than the surface speed of the polyurethane layer, and is adjustable with respect to the surface of the roll core or wheel 19, as by means of a hydraulic cylinder and piston 23a.

In the FIG. 4 and 5 illustrations, which are representative of the treading of a wheel, the wheel 25 is rotated at a given speed about its horizontal axis during the application of a heavy layer 26 of fluid polyurethane. The pressure or smoothing roller 27 is, in this instance, circumferentially channeled to the desired shape of the tread; and it preferably has marginal circumferential flanges 28 that overlap the wheel 25 for shearing off any excess polyurethane that may tend to flow axially during the levelling operation. Again, the roller is adjustable with respect to the surface of wheel 25, preferably by means of a hydraulic cylinder and piston 27a. As before, a heavy layer 29 of oily substance completely covers the polyurethane to prevent it from sticking to roller 27. The process is complete after the plastic has cured sufficiently to retain its intended shape. In the apparatus of FIGS. 4 and 5, the delivery hopper 120 has a lower margin 120a which serves as a doctor blade to retard the material flow and give the layer a preliminary shape.

The foregoing process can be carried out at room temperatures but if performed at elevated temperatures of say up to about 300° F., the process can be carried out in a proportionately shorter time. Also, when processing at the lower temperature an accelerator may be added to the polyurethane while at higher temperatures a retarder can be added thus giving absolute control over the rate of curing.

As an example, when making up a wheel or roll requiring about 1 pound of polyurethane, having a viscosity of substantially the viscosity of No. 5 motor oil, the polyurethane layer is built up to the required thickness over a period of about 5 minutes while being preliminarily levelled and shaped by the doctor blade. The pressure or leveling roller than is progressively moved into contact with the polyurethane layer, which is enveloped in the oily substance, and allowed to act on the layer for about three minutes, during which time it is gradually moved inwardly by means of the hydraulic cylinder and piston as the shaping and leveling proceeds. These time intervals may be course vary depending upon the temperature and whether or not a retarder or accelerator has been added to the polyurethane. In some instance the polyurethane may have a viscosity substantially responding to the viscosity of a heavy grease in which event the time intervals can be reduced by increasing the speeds of the applied surface and roller.

A wide variety of wheels or rolls having treads of various shapes may be made by varying the initial shape to which the polyurethane layer is formed by the doctor blade, and by varying the shape of the pressure roller. Furthermore, articles such as O-rings, or other annular packings having different cross-sections, may be made by flowing the polyurethane onto a mandrel of suitable surface configuration, preliminarily shaping it by use of a suitably shaped doctor blade, and final forming by use of a suitably shaped roller. Where a roll or wheel is coated, the core thereof is provided with a bonding agent while production of annular members such as O-rings requires that a release agent be applied to the mandrel.

Although I have described the steps of the method in considerable detail, it will be understood that the description thereof is intended to be illustrative, rather than restrictive, as many details of the disclosed method may be varied without departing from the spirit or scope of the invention. Accordingly, I do not desire to be restricted to the precise sequence of steps described.

I claim:

1. The method of forming belts, tires, O-rings, strips and similar products from polyurethane and like material comprising the successive steps of: flowing a quantity of polyurethane in a readily flowable state on to a supporting surface moving at a controlled rate of travel in relation to the flow rate of the polyurethane; subjecting the so applied polyurethane to a doctoring action thereby to effect a preliminary shaping of said product in a state of partial cure and having an exposed surface; flowing on to the exposed surface of the moving, preliminarily shaped polyurethane product a liquid force-transmitting medium; subjecting the preliminarily shaped polyurethane product to external pressure exerted on said exposed surface in a manner as effects dynamic flow of the polyurethane and final shaping of the preliminarily shaped product to that of the desired product by shear action developed and transmitted by and through said medium; and finally curing the finally shaped polyurethane product to a physically stable condition.

2. The method of claim 1, in which the liquid force-transmitting medium is an oily substance of the order of No. 30 motor oil.

3. The method of claim 1, and the further step of coating the supporting surface with a bonding agent before flowing the polyurethane onto same so that the finished product includes the supporting surface.

4. The method of claim 1, and the further preliminary steps of coating the supporting surface with a release agent before flowing the polyurethane on to same and the final step of removing the polyurethane product from the supporting surface after it has cured to a physically stable condition.

5. The method of claim 1, in which the supporting surface is cylindrical and rotates about a horizontal axis, and in which said surface is rotated at a speed low enough to insure against the polyurethane present thereon being flung therefrom by centrifugal force.

6. The method of claim 1, in which the supporting surface is flat.

7. The method of claim 1, in which the external pressure is applied by moving means having a surface speed in the same direction as, and is at least equal to, that of the moving supporting surface.

8. The method of claim 7, in which the surface speed of said moving pressure applying means is 10%–25% greater than that of the moving supporting surface.

References Cited by the Examiner

UNITED STATES PATENTS

| | | | |
|---|---|---|---|
| 2,129,607 | 9/1938 | Schott | 264—216 |
| 3,168,605 | 2/1965 | Ellegast | 264—216 X |

ROBERT F. WHITE, *Primary Examiner.*

ALFRED L. LEAVITT, *Examiner.*

R. B. MOFFITT, *Assistant Examiner.*